United States Patent
Ikeuchi et al.

(10) Patent No.: US 6,597,485 B1
(45) Date of Patent: Jul. 22, 2003

(54) OPTICAL TRANSMITTER CIRCUIT

(75) Inventors: Tadashi Ikeuchi, Sagamihara (JP); Tadao Inoue, Ebina (JP); Toru Matsuyama, Sapporo (JP); Makoto Miki, Sapporo (JP); Norio Ueno, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/517,621

(22) Filed: Mar. 3, 2000

(30) Foreign Application Priority Data

Mar. 19, 1999 (JP) .......................................... 11-075025

(51) Int. Cl.⁷ ............................................. H04B 10/04
(52) U.S. Cl. .................................. 359/187; 372/29.011
(58) Field of Search ................................. 359/154, 161, 359/180, 187; 372/29.011, 29.014, 29.015, 29.02, 29.021, 31

(56) References Cited

U.S. PATENT DOCUMENTS

| | | | | |
|---|---|---|---|---|
| 4,201,907 A | * | 5/1980 | Otten ........................... | 377/38 |
| 4,502,143 A | * | 2/1985 | Kato et al. ................... | 714/812 |
| 4,856,008 A | * | 8/1989 | Senma et al. ................. | 372/31 |
| 4,856,011 A | * | 8/1989 | Shimada et al. ......... | 372/29.01 |
| 4,884,278 A | * | 11/1989 | Nishimoto et al. ............ | 372/26 |
| 5,060,302 A | * | 10/1991 | Grimes ....................... | 359/135 |
| 5,105,077 A | * | 4/1992 | Asada ......................... | 250/205 |
| 5,390,041 A | * | 2/1995 | Knecht et al. .............. | 359/158 |
| 5,418,806 A | * | 5/1995 | Araki .................... | 372/29.015 |
| 5,598,290 A | * | 1/1997 | Tanaka et al. .............. | 359/180 |
| 6,256,329 B1 | * | 7/2001 | Ishizuka et al. ......... | 372/38.02 |

* cited by examiner

Primary Examiner—Jason Chan
Assistant Examiner—Sherif R. Fahmy
(74) Attorney, Agent, or Firm—Staas & Halsey LLP

(57) ABSTRACT

An optical transmitter circuit including a light receiving element, such as a photodiode, which monitors the optical output of a light emitting element such as a semiconductor laser. A current-voltage converting circuit supplies a drive current from a drive circuit to the light emitting element and converts the output voltage of the light receiving element into voltage. An APC amplifier compares the converted output signals and a reference signal, and a hold circuit holds the output signal of the APC amplifier and uses the output signal as a current control signal of the drive circuit. A "1" continuous signal detecting circuit detects the continuation of "1" in a specified number of bits in the input data (DATA) and updates the hold value in the hold circuit.

17 Claims, 15 Drawing Sheets

OPTICAL TRANSMITTER CIRCUIT

CROSS REFERENCE TO RELATED APPLICATIONS

This application is based upon and claims priority of Japanese Patent Application No. 11-75025, filed Mar. 19, 1999, the contents being incorporated herein by reference.

BACKGROUND OF THE INVENTION

1. Field of the Invention

The present invention relates to an optical transmitter circuit which enables reliable monitoring of optical signals generated by a light emitting element, such as a semiconductor laser, with a comparatively inexpensive light receiving element, such as a photodiode. More particularly, the present invention relates to an optical transmitter circuit having a circuit to detect continuous "1" bits in the input data in order to perform update timing of a current control signal or deterioration evaluation of the light emitting element.

2. Description of the Related Art

Optical transmitter circuits are known. FIG. 13 illustrates an example of a conventional optical transmitter circuit, including a light emitting element 101 such as a semiconductor laser, a light receiving element 102 such as a photodiode to monitor light, a current-voltage converter (I/V) 103, an auto power control (APC) amplifier 104, a drive circuit 105, a sample hold circuit 106, and an analog switching circuit 107.

In operation of the conventional optical transmitter circuit shown in FIG. 13, the drive circuit 105 supplies drive current to the light emitting element 101 in accordance with input data (DATA). An optical signal is generated by the light emitting element 101 in accordance with the input data (DATA). The optical signal is detected by the monitoring light receiving element 102, converted into voltage by the current-voltage converting circuit 103, and input into the APC amplifier 104. The APC amplifier 104 compares the output signal of the current-voltage converting circuit 103 and a reference value, and inputs a signal corresponding to the comparative differential thereof into the sample hold circuit 106 via the analog switching circuit 107.

The analog switching circuit 107 receives the output signal of the APC amplifier 104 when the data (DATA) converted to optical signals is transmitted at level "1", which output signal is input and held in the sample hold circuit 106. The held signal is input into the drive circuit 105 as a current control signal, and the drive current of the light emitting element 101 is controlled so that the optical output remains constant.

FIGS. 14A–14D are diagrams explaining the operation of the conventional example of the optical transmitter circuit shown in FIG. 13. More specifically, FIG. 14A illustrates the data (DATA) input to the drive circuit 105; FIG. 14B illustrates the optical output signal of the light emitting element 101; FIG. 14C illustrates the output signal of the current-voltage converting circuit 103; and FIG. 14D illustrates the drive current supplied to the light emitting element 101.

In the example shown in FIGS. 14A–14D, when the optical output signal of the light emitting element 101 corresponding to the data (DATA) that is input at time t1 decreases, as indicated by the OUTPUT DETERIORATION in FIG. 14B, the output signal of the current-voltage converting circuit 103 also decreases, as shown in FIG. 14C. The decreased output signal of the current voltage converting circuit 103 is held by the sample hold circuit 106 via the analog switching circuit 107, and a drive current is supplied to the light emitting element 101 from the drive circuit 105 as a current control signal corresponding to the data (DATA) that is input at the following time t2. More particularly, as shown in FIG. 14D, since the drive current corresponding to the data (DATA) that is input at time t2 is increased more than the drive current corresponding to the data (DATA) input at time t1, the optical output signal is controlled to a specified level, as indicated by the OUTPUT RECOVERY of FIG. 14B.

Furthermore, a circuit is known in which stabilization of the optical output is achieved by converting the output current of the light receiving element, which converts the optical output of the light emitting element, into voltage with a current-voltage converting circuit. When the converted optical output of the light emitting element reaches a specified level or above, the circuit determines the output to be a significant detection signal, holds it as a sample, and controls the drive current of the light emitting element in accordance with the held value. An example of this type of circuit is disclosed in Japanese Unexamined Laid-Open Patent Application Publication JP9-18054, wherein the input data is delayed and is considered to be a significant detection signal, and the output signal of the current-voltage converting circuit at this time is held as a sample.

When data (DATA) that is input is increased in speed, e.g., from a low speed of 50 Mbps to 150 Mbps, the light emitting element 101 has sufficient response speed since the light emitting element 101 is generally a semiconductor laser. However, a photodiode is generally used as the light receiving element 102. Because the photodiode has an increased surface area in order to increase the light receiving sensitivity, the capacitance $C_{PD}$ of the photodiode is generally, for example, 20 pF or above. Accordingly, when the current-voltage converting circuit 103 includes a resistance R, the band region $f_O$ is determined by the equation $f_O = \frac{1}{2}\pi R C_{PD}$, so it is extremely difficult to broaden the band. In other words, when a comparatively inexpensive photodiode is used as a light receiving element 102 to monitor the light emitting element 101, the response characteristics are not sufficient to detect an optical signal having a high speed of 150 Mbps or more.

FIGS. 15A–15D are diagrams illustrating problems occurring with the APC amplifier 104 operation in accordance with the conventional optical transmitter circuit. More specifically, FIG. 15A illustrates the data (DATA) input to the drive circuit 105; FIG. 15B illustrates the optical output signal of the light emitting element 101; FIG. 15C illustrates the output signal of the current-voltage converting circuit 103; and FIG. 15D illustrates the drive current supplied to the light emitting element 101. When the input shown in FIG. 15A occurs, the sample hold circuit 106 samples and holds the output signal of the APC amplifier 104 when the data (DATA) has been input. At this time, since the response speed of the light receiving element 102 is lower than the speed of the input data (DATA), the output signal of the current-voltage converting circuit 103 changes, as shown in FIG. 15C.

Moreover, the current control signal corresponding to the value that has been sampled and held is updated at the times t1, t2, t4, and t6, as indicated by the arrows showing the CURRENT UPDATE VALUE in FIG. 15, and the drive current supplied to the light emitting element 101 from the drive circuit 105 is updated. Accordingly, the output signal of the current-voltage converting circuit 103 resulting from the monitoring of the optical output produced by the light receiving element 102 in response to an initial input value of "1" becomes equal to or less than the set value indicated by the broken line at the time t1 in FIG. 15C. Because this output signal of the current-voltage converting circuit 103 is sampled and held, it is judged to be a lower optical output than a specified level, and the drive current supplied to the light emitting element 101 for the next continued data value of "1" increases, as shown in FIG. 15D. Accordingly, the optical output signal of the light emitting element 101 at this time becomes greater than the initial optical output, as shown in FIG. 15B.

In this state, at the following time t3, the drive current corresponding to the input data (DATA) "1" is supplied to the light emitting element 101. At this time, even if the optical output of the light emitting element 101 exceeds the specified level, the output signal of the current-voltage converting circuit 103 is lower than the set value at time t4 because of the response speed of the light receiving element 102, as shown in FIG. 15C. By sampling and holding the output signal of the current-voltage converting circuit 103, the drive current with respect to the input data (DATA) "1" at the next time t5 is further increased, as shown in FIG. 15D.

Monitoring the level of the output signals of the current-voltage converting circuit 103, and determining whether there is deterioration of the light emitting element 101 when this level falls below a specified value has been considered. However, since the response speed of the light receiving element 102 is insufficient as described above, there is a problem that a drop in the optical output level of the light emitting element 101 can be mistakenly assumed.

The above-described problem occurs when a photodiode which does not have a small capacitance is used as the light receiving element 102 in performing APC control. For this reason, the selection and use of a photodiode having a capacitance $C_{pd}$ of 2 pF or less as the light receiving element 102 has been considered. However, this type of photodiode is extremely expensive. Photodiodes having high-speed response characteristics are also expensive. Thus, it has been extremely difficult to achieve cost reduction in the optical transmitter circuit which performs stabilization of the optical output and detection of deterioration in the optical signals with respect to high-speed data.

SUMMARY OF THE INVENTION

It is an object of the present invention to provide an optical transmitter which achieves stabilization of the optical output and thus enables a reliable detection of deterioration of a light emitting element, even when a photodiode which does not have a small capacitance is used as a light receiving element.

Objects and advantages of the present invention are achieved in accordance with embodiments of the present invention with an optical transmitter circuit comprising a light emitting element to convert input data to an optical output; a light receiving element to receive the optical output of the light emitting element and to output a current corresponding to the optical output; a current-voltage converting circuit to convert the output current of the light receiving element into a voltage and to output a voltage signal; an APC amplifier to compare the output voltage signal of the current-voltage converting circuit and a reference signal and to output a differential output signal; a hold circuit to hold the output signal of the APC amplifier and to form a current control signal; a drive circuit to receive the current control signal from the hold circuit and to supply drive current to the light emitting element in accordance with the current control signal; and a "1" continuous signal detecting circuit to detect a specified number of continuous of "1" bits in the input data and to perform an updating operation on the output signal of the amplifier held in the hold circuit.

In accordance with embodiments of the present invention, the hold circuit may comprise an analog switching circuit to receive the output signal of the amplifier and a detection signal of the "1" continuous signal detecting circuit, and to switch on in response to the "1" continuous signal detecting circuit detecting the specified number of continuous "1" bits; and a peak detecting circuit to detect and hold a peak value of the output signal of the AC amplifier that is input via the analog switching circuit.

The optical transmitter circuit may further comprise a peak detecting circuit to detect a peak value of the output signal of the current-voltage converting circuit and to input the peak value to the amplifier.

The optical transmitter circuit may further comprise a first peak detecting circuit to detect a peak value of the output signal of the current-voltage converting circuit and to output the peak value to the amplifier; and a second peak detecting circuit to detect a peak value of the input data and to output the peak value of the input data to the amplifier as a reference value.

In accordance with embodiments of the present invention, the hold circuit may comprise an up/down counter to count up or down corresponding to an output signal of the amplifier, in response to the "1" continuous signal detecting circuit detecting the specified number of continuous "1" bits; and a D/A converter to convert the contents of the count of the up/down counter to an analog signal and to input the contents of the count of the up/down counter to the drive circuit as an analog current control signal.

Objects and advantages of the present invention are achieved in accordance with embodiments of the present invention with an optical transmitter circuit, comprising a light emitting element to convert input data into an optical output; a light receiving element to receive the optical output of the light emitting element and to output a current corresponding to the optical output; a current-voltage converting circuit to convert the output current of the light receiving element into a voltage and to output a voltage signal; a light deterioration detecting comparator to detect deterioration in the light emitting element by comparing the output signal of the current-voltage converting circuit with a reference value and to output a deterioration detection signal; a "1" continuous signal detecting circuit to detect a specified number of continuous "1" bits in the input data; and a flip-flop to hold the deterioration detection signal from the light deterioration detection comparator in accordance with the detection signal from the "1" continuous signal detecting circuit.

In accordance with embodiments of the present invention, stabilization of the optical output of the light emitting element and detection of deterioration of the light emitting element can be performed. Furthermore, in accordance with embodiments of the present invention, stabilization of the hold value of the hold circuit or evaluation of light emitting element deterioration is performed by delaying the detection signal from the "1" continuous signal detecting circuit by a delay circuit.

BRIEF DESCRIPTION OF THE DRAWINGS

The above and other objects and advantages of the present invention will become apparent and more readily appreciated from the following description of the preferred embodiments, taken in conjunction with the accompanying drawings, of which.

DESCRIPTION OF THE PREFERRED EMBODIMENTS

Figure 1:
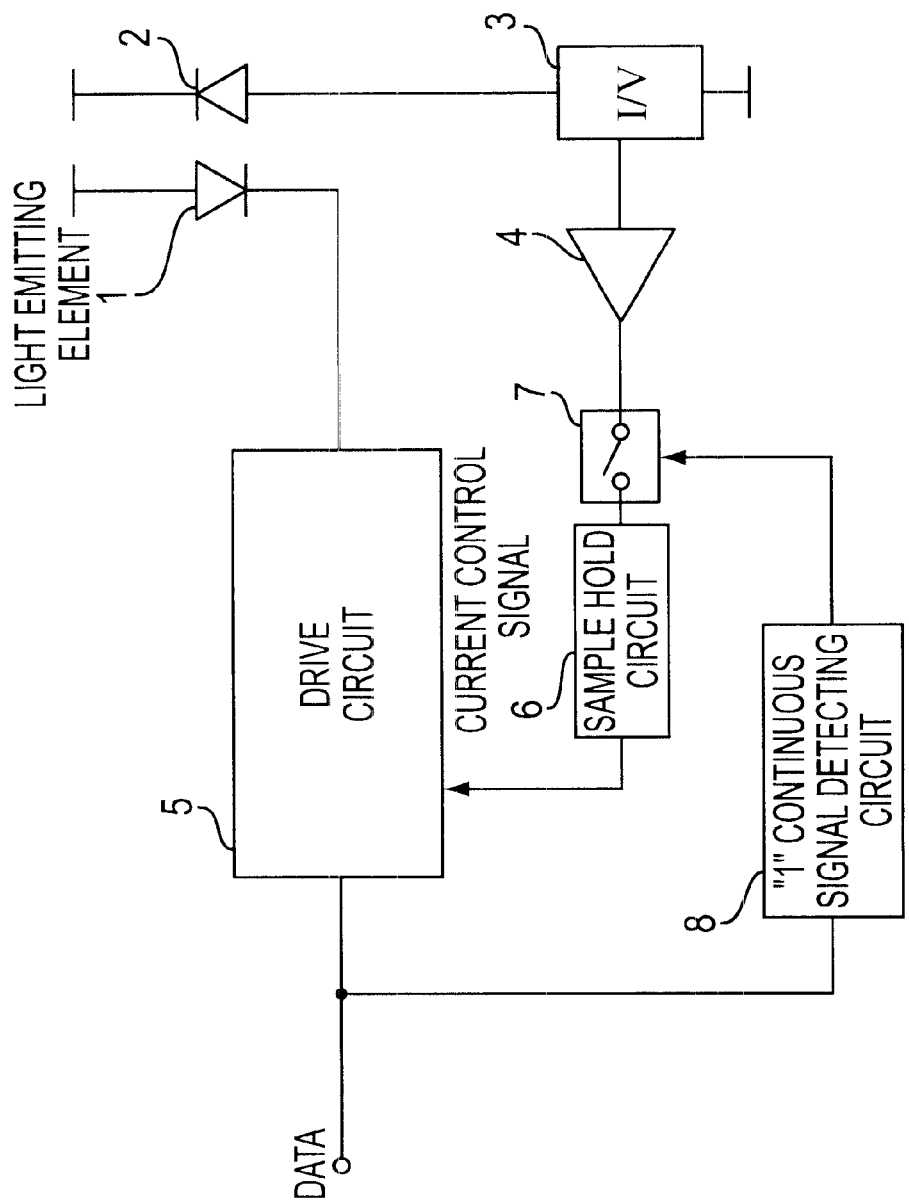
FIG. 1 is a block diagram of an optical transmitter in accordance with a first embodiment of the present invention.

Reference will now be made to the present preferred embodiments of the invention, examples of which are illustrated in the accompanying drawings, wherein like reference numerals refer to like elements throughout.

FIG. 1 is a block diagram of an optical transmitter in accordance with a first embodiment of the present invention. As shown in FIG. 1, the optical transmitter includes a light emitting element 1 such as a semiconductor laser, a light receiving element 2 such as a photodiode, a current-voltage converting circuit (I/V) 3, an APC amplifier 4, a drive circuit 5, a sample hold circuit 6, an analog switching circuit 7, and a "1" continuous signal detecting circuit 8.

The light receiving element 2 is a photodiode to monitor the output current of the light emitting element 1. In accordance with the present invention, the light receiving element 2 is preferably a photodiode which does not have a small capacitance. For example, the capacitance of the light receiving element 2 photodiode may be 20 pF, or approximately 20 pF. The monitored output of the light emitting element 1 produced by the light receiving element 2 is a current which is converted to voltage by the current-voltage converting circuit 3. The voltage output by the current-voltage converting circuit 3 is then compared with a reference value by the APC amplifier 4, and the differential output signal of the APC amplifier 4 is input to the sample hold circuit 6 via the analog switching circuit 7. The value held by the sample hold circuit 6 is then input to the drive circuit 5 as a current control signal. Furthermore, the "1" continuous signal detecting circuit 8 detects the continuation of a bit value of "1" in the data (DATA) input to the drive circuit 5. When it is detected that several "1" bits have been generated continuously, the analog switching circuit 7 is switched on, and the output signal of the APC amplifier 4 is input and held in the sample hold circuit 6.

Therefore, in accordance with embodiments of the present invention, even when a light receiving element 2 having a slower response speed than the speed of the input data (DATA) is used, because the light emitting element 1 converts to continuous optical signals in response to the detection of continuous "1" bits, the monitored output of the light receiving element 2 is also gradually increased to a specified value. The continuous number of "1" bits that is detected to increase the output of the light receiving element 2 to the specified value is a predetermined number set in advance, and the output signal of the APC amplifier 4 when "1" has been detected in the predetermined number of continuous bits is held in the sample hold circuit 6. Therefore, if the light receiving element 2 is a photodiode which does not have a small capacitance, the stabilization of the optical output can be achieved in accordance with the output signal of the APC amplifier 4. Moreover, if the hold value of the sample hold circuit 6 falls below a set value, it can be determined that there has been deterioration in the light emitting element 1.

In accordance with embodiments of the present invention, a default value is set as an initial status of the sample hold circuit 6, and a default value of the current control signal can thereby be input to the drive circuit 5. The default value can be updated by a continuous "1" bit detection, as described above.

Figure 2:
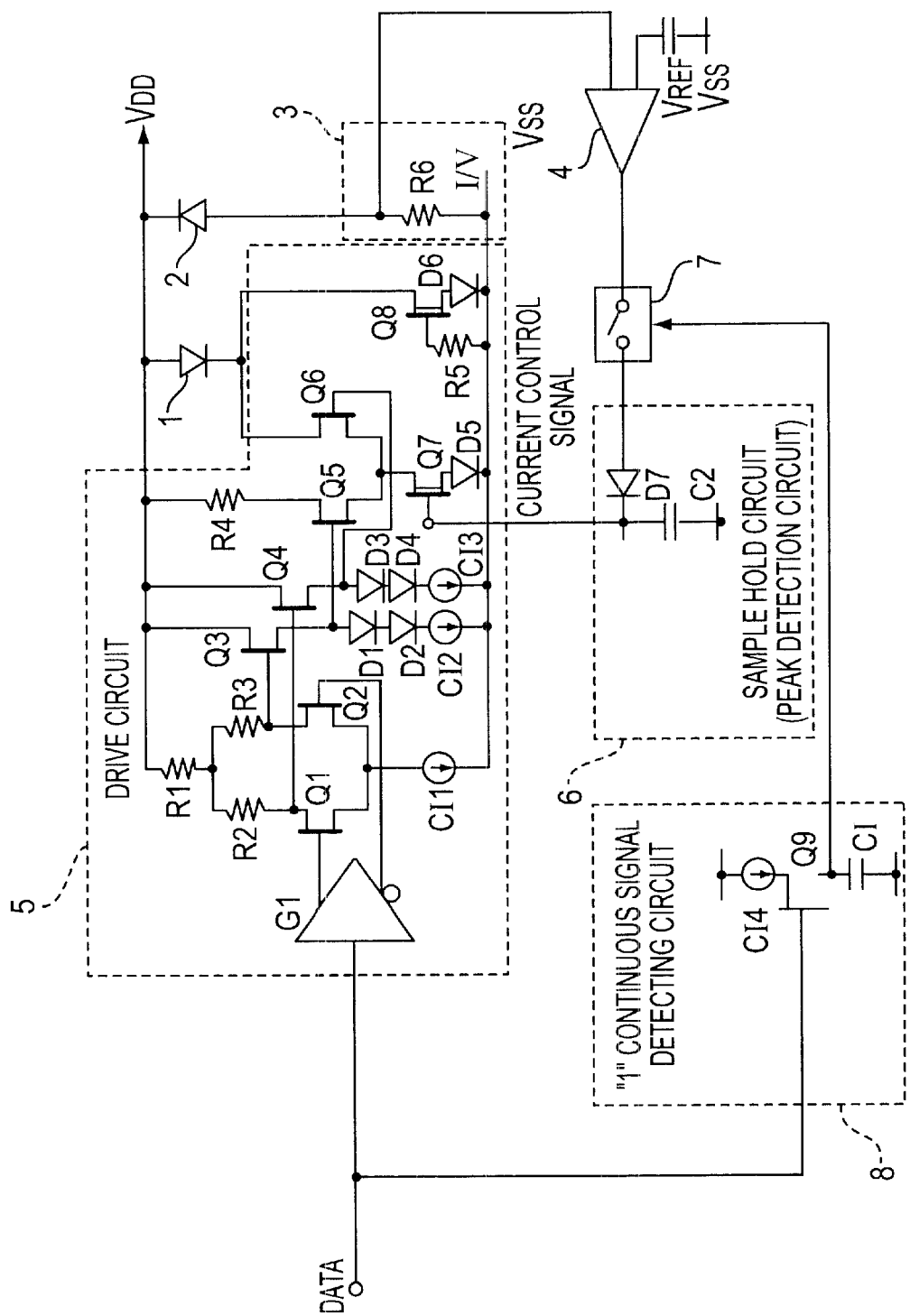
FIG. 2 is a circuit diagram of the optical transmitter in accordance with the first embodiment of the present invention.

FIG. 2 is a circuit diagram of the optical transmitter in accordance with the first embodiment of the present invention. As shown in FIG. 2, Q1 through Q9 are field effect transistors (FETs), and Q7 and Q8 represent depression type field effect transistors. Hereinafter, the FETs are referred to simply as transistors. C1 and C2 are capacitors, D1 through D7 are diodes, R1 through R6 are resistors, CI1 through CI4 are constant-current supplies, $V_{DD}$ and $V_{SS}$ are power voltage, $V_{REF}$ is a reference voltage, and G1 a complementary output gate circuit.

As shown in FIG. 2, the current-voltage converting circuit 3 is comprised of a resistor R6. The output current of the light receiving element 2 corresponding to the optical output of the light emitting element 1 is converted to voltage by the resistor R6, input to the APC amplifier 4, and compared with the reference voltage $V_{REF}$. The differential output signal of the APC amplifier 4 is input to the sample hold circuit 6 via the analog switching circuit 7.

The sample hold circuit 6 is preferably a peak detection circuit comprising a diode D7 and capacitor C2. The sample hold circuit 6 inputs the terminal voltage of the capacitor C2 to the gate of the transistor Q7 of the drive circuit 5 as a voltage control signal.

As shown in FIG. 2, the "1" continuous signal detecting circuit 8 is comprised of a constant-current supply CI4, a transistor Q9, and a capacitor C1. The transistor Q9 is switched on in accordance with a "1" bit in the input data (DATA), and the capacitor C1 is charged from the constant current supply CI4. Transistor Q9 is switched off in accordance with "0" bit in the input data (DATA). When the transistor Q9 is switched off, the capacitor C1 discharges via analog switching circuit 7, or alternatively via a pathway not shown in the drawing.

In accordance with the first embodiment of the present invention, the discharge time constant of the capacitor C1 is set corresponding to the transmission speed of the input data (DATA), and the capacitor C1 is structured to discharge to under a specified value at least within a 1-bit interval of a "0." When a "1" has continued in the input data for two (2) bits or longer, the terminal voltage of the capacitor C1 exceeds the specified value and is input to the analog switching circuit 7 as a detection signal via a gate circuit or the like (not shown in the figure), thereby switching on the analog switching circuit 7.

In accordance with embodiments of the present invention, the analog switching circuit 7 comprises a field effect transistor (FET), and the terminal voltage of the capacitor C1 is applied to a gate thereof so that the field effect transistor is switched on when the terminal voltage of the capacitor C1 exceeds a specified level. The "1" continuous signal detecting circuit 8 may also operate such that the terminal voltage of the capacitor C1 is made to exceed the specified value when "1" has continued for three (3) bits or more, and the analog switching circuit 7 is switched on only when "1" has continued for three (3) bits or more.

Moreover, the drive circuit 5 includes a gate circuit G1 into which data (DATA) is input, and output signals from a non-inverted output terminal of the gate circuit G1 are input to the gate of the transistor Q1. Output signals from the inverted output terminal of the gate circuit G1 are input to the gate of the transistor Q2. The transistors Q1 and Q2 make up a differential circuit in conjunction with a constant-current supply CI1, which is commonly connected to the source of transistors Q1 and Q2. A level conversion circuit, formed by transistors Q3 and Q4 and constant-current supplies CI2 and CI3, inputs level-converted signals to the gates of transistors Q5 and Q6, inputs a current control signal to the transistor Q7 which is commonly connected to transistors Q5 and Q6, and controls the current value supplied to the light emitting element 1 via the transistor Q6. Furthermore, the bias current of the light emitting element 1 is applied via the transistor Q8 in accordance with the setting of the resistor R5.

Figure 3:
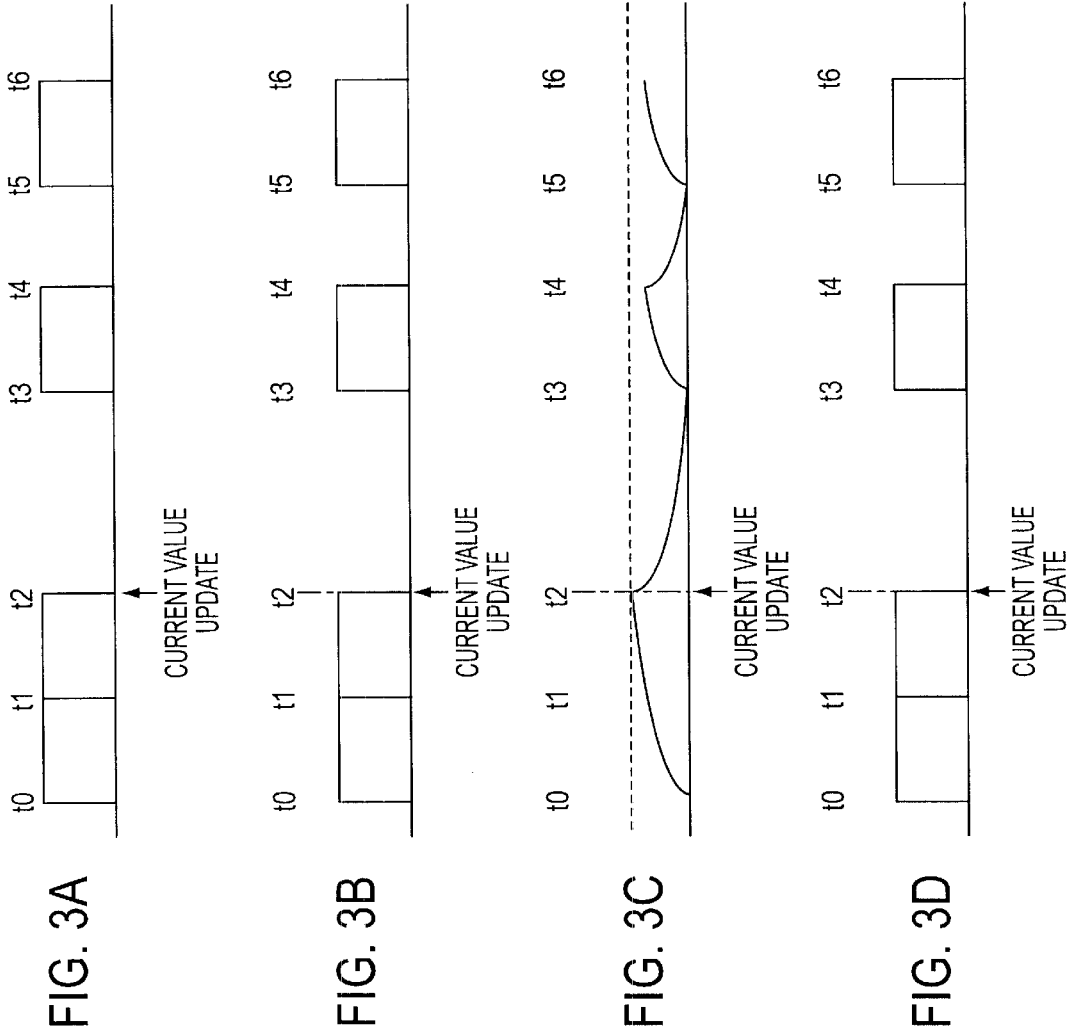
FIGS. 3A–3D are diagrams explaining the operation of the optical transmitter in accordance with the first embodiment of the present invention.

FIGS. 3A–3D are diagrams explaining the operation of the optical transmitter in accordance with the first embodiment of the present invention. More specifically, FIG. 3A illustrates data (DATA) input to the optical transmitter, FIG. 3B illustrates the optical output signal of the light emitting element 1, FIG. 3C illustrates the output signal of the current-voltage converting circuit 3, and FIG. 3D illustrates the drive current supply to the light emitting element 1. As shown in FIG. 3A, when a "1" bit is input continuously at time t0 and at the following time t1, even when the output signal of the current-voltage converting circuit 3 does not increase to the set value (indicated by the broken line shown in FIG. 3C) because of the response delay of the light receiving element 2, the output signal of the current-voltage converting circuit 3 is able to increase to the set value at the time t2 because of the continuation of "1" for two (2) bits.

At this time, the terminal voltage of the capacitor C1 of the "1" continuous signal detecting circuit 8 exceeds the specified value following time t1. The analog switching circuit 7 is thereby switched on, and, as shown as the CURRENT VALUE UPDATE at the time t2, the peak value of the output signal of the APC amplifier 4 is held by the capacitor C2 of the sample hold circuit 6. Accordingly, a drive current roughly equal to the drive current supplied to the data input in the previous times t0 and t1 is supplied to the data input at the following time t3.

When one isolated "1" bit is input at times t3 and t5, respectively, the output signal of the current-voltage converting circuit 3 does not increase to the set level indicated by the broken line at times t4 and t6 because of the slow response characteristics of the light receiving element 2. Moreover, the terminal voltage of the capacitor C1 of the "1" continuous signal detecting circuit 8 does not increase to the specified level, and thereby the analog switching circuit 7 remains off. Accordingly, since the output signal of the APC amplifier 4 corresponding to the excessive output signal of the current-voltage converting circuit 3 is not held, the current value is not updated.

When "1" bits are continuously input, the analog switching circuit 7 is switched on by the "1" continuous signal detecting circuit 8, and the output signal of the APC amplifier 4 can be held in the sample hold circuit 6. In other words, since holding by the sample hold circuit 6 can be performed at the timing indicated as a CURRENT VALUE UPDATE in FIGS. 3A–3D, even in the case of an independent bit input during the time t3 or t5, the drive current of the light emitting element 1 can be controlled so as to obtain a normal optical output.

The case wherein the output signal of the current-voltage converting circuit 3 has risen to the reference level when a "1" has continued for two (2) bits or longer will now be described below. The continuous number of "1" bits to be detected is set in accordance with the relationship between the speed of the input data (DATA) and the response characteristics of the light receiving element 2. For example, when "1" has continued for three (3) bits or longer, and a light receiving element 2 having response characteristics which increase to the set value is used, as described above, the "1" continuous signal detecting circuit 8 may operate so that the analog switching circuit 7 is switched on when three continuous "1" bits have been detected.

Figure 4:
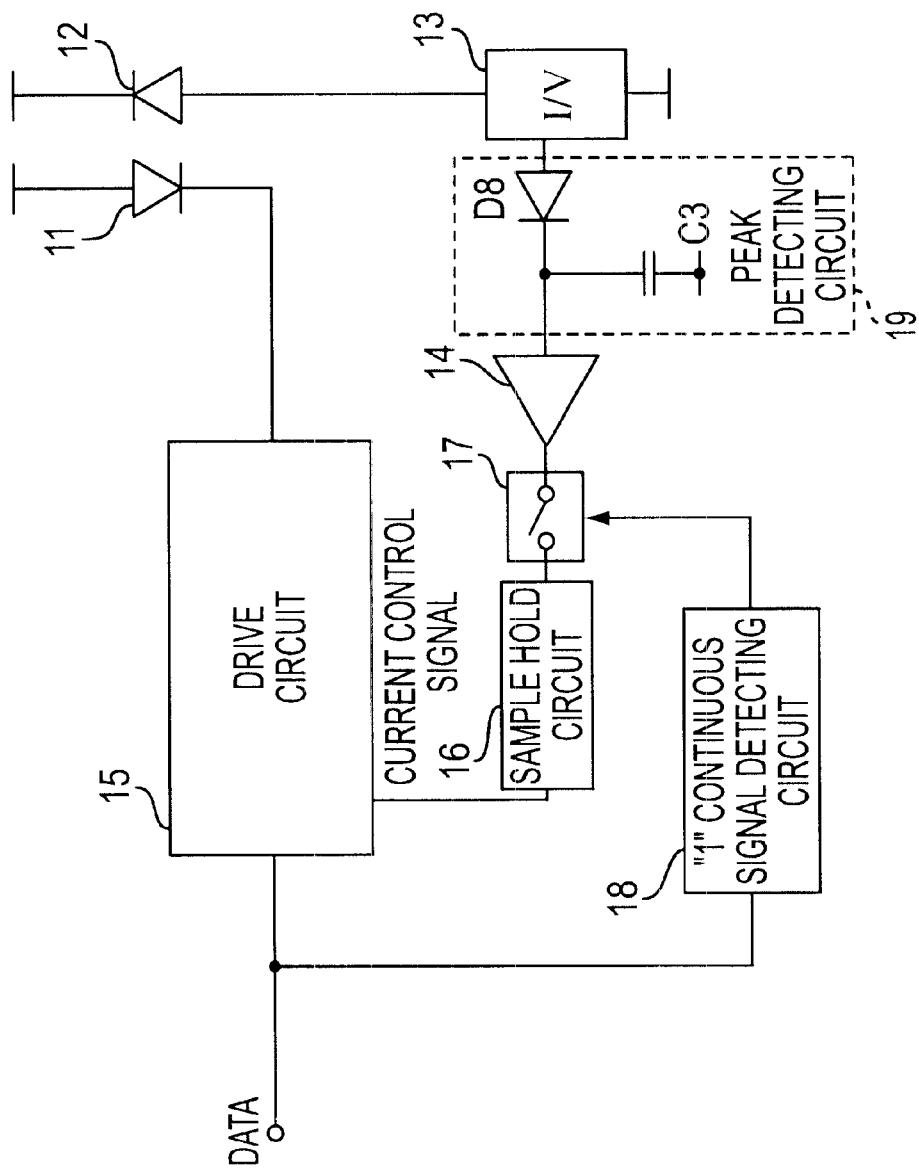
FIG. 4 is a block diagram of an optical transmitter in accordance with a second embodiment of the present invention.

FIG. 4 is a block diagram of an optical transmitter in accordance with a second embodiment of the present invention. The optical transmitter shown in FIG. 4 includes a light emitting element 11, such as a semiconductor laser, a light receiving element 12 such as a photodiode, a current-voltage converting circuit (I/V) 13, an APC amplifier 14, a drive circuit 15, a sample hold circuit 16, an analog switching circuit 17, a "1" continuous signal detecting circuit 18, and a peak detecting circuit 19 including a capacitor C3 and a diode D8.

In accordance with the second embodiment of the present invention, in a manner similar to the embodiment shown in FIG. 1, when, for example, at least two (2) continuous bits of data (DATA) that are input as "1" are detected by the "1" continuous signal detecting circuit 18, the analog switching circuit 17 is switched on, and the output signal of the APC amplifier 14 is input to the sample hold circuit 16 and held. The value held by the sample hold circuit 16 is input to the drive circuit 15 as a current control signal to control the drive current supplied to the light emitting element 11 in accordance with the input data (DATA). The optical output of the light emitting element 11 corresponding to the drive current is monitored by the light receiving element 12.

The peak detecting circuit 19 is provided between the current-voltage converting circuit 13 and the APC amplifier 14. The peak detecting circuit 19 detects the peak value of the output signal of the current-voltage converting circuit 13 and inputs the detected peak value to the APC amplifier 14. The output signal of the current-voltage converting circuit 13 is temporarily held by the peak detecting on circuit 19. Temporarily holding the output signal of the current-voltage converting circuit 13 stabilizes the output signal of the APC amplifier 14, which is input via the analog switching circuit 17 to the sample hold circuit 16, thereby preventing an operational error when the current control signal that is held in the sample hold circuit 16 is updated.

Figure 5A:
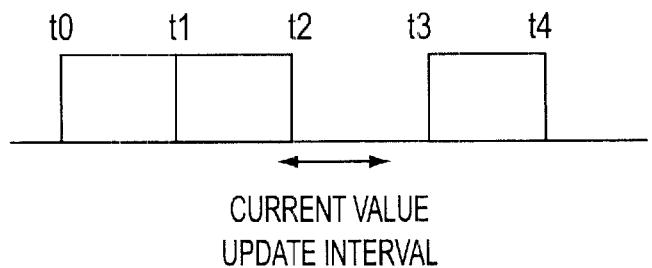
FIGS. 5A–5D are diagrams explaining the operation of the optical transmitter in accordance with the second embodiment of the present invention.
Figure 5B:
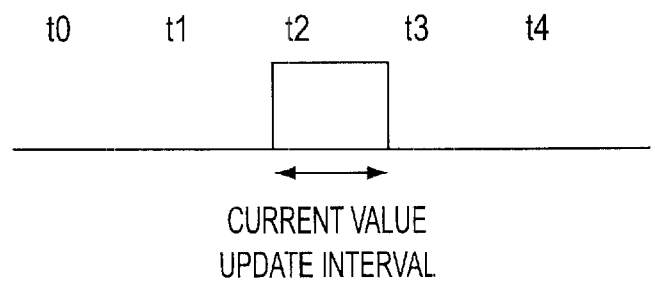
Figure 5C:
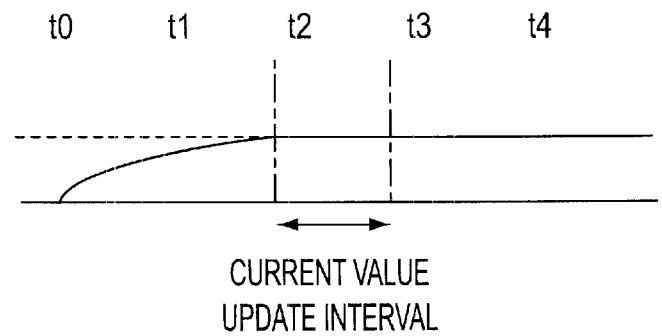
Figure 5D:
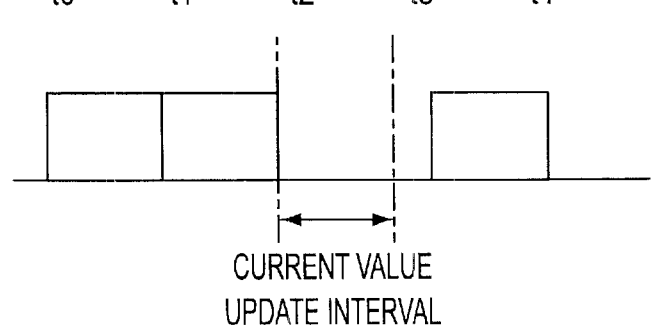

FIGS. 5A–5D are diagrams explaining the operation of the optical transmitter in accordance with the second embodiment of the present invention. More specifically, FIG. 5A illustrates the data (DATA) input into the drive circuit 15; FIG. 5B illustrates the output signal of the "1" continuous signal detecting circuit 18; FIG. 5C illustrates the output signal of the peak detecting circuit 19; and FIG. 5D illustrates the drive current applied from the drive circuit 15 to the light emitting element 11.

As shown in FIGS. 5A–5D, when two (2) bits of input data (DATA) continue as "1," as during times t0 and t1 in FIG. 5A, drive current is supplied to the light emitting element 11, as shown in FIG. 5D, and the corresponding optical output is detected by the light receiving element 12. At this time, the output signal of the current-voltage converting circuit 13 gradually increases in accordance with the response characteristics of the light receiving element 12. Thus, the output signal of the peak detecting circuit 19 also gradually increases, as shown in FIG. 5C, to the set value indicated by the broken line during time t2, for example.

Furthermore, as shown in FIG. 5B, when the "1" continuous signal detecting circuit 18 detects two (2) continuous "1" bits, it outputs a detection signal during time t2. The analog switching circuit 17 is thus switched on, and the output signal of the peak detecting circuit 19 shown in FIG. 5C at this time is held by the sample hold circuit 16. More particularly, during the "on" interval of the analog switching circuit 17, which is indicated as a CURRENT VALUE UPDATE INTERVAL in FIGS. 5A–5D, the current control signal is updated with respect to the drive circuit 15. In this case, the peak value of the output signal of the current-voltage converting circuit 13 is held by the peak detecting circuit 19, so that holding in the sample hold circuit 16 can be reliably performed.

Figure 6:
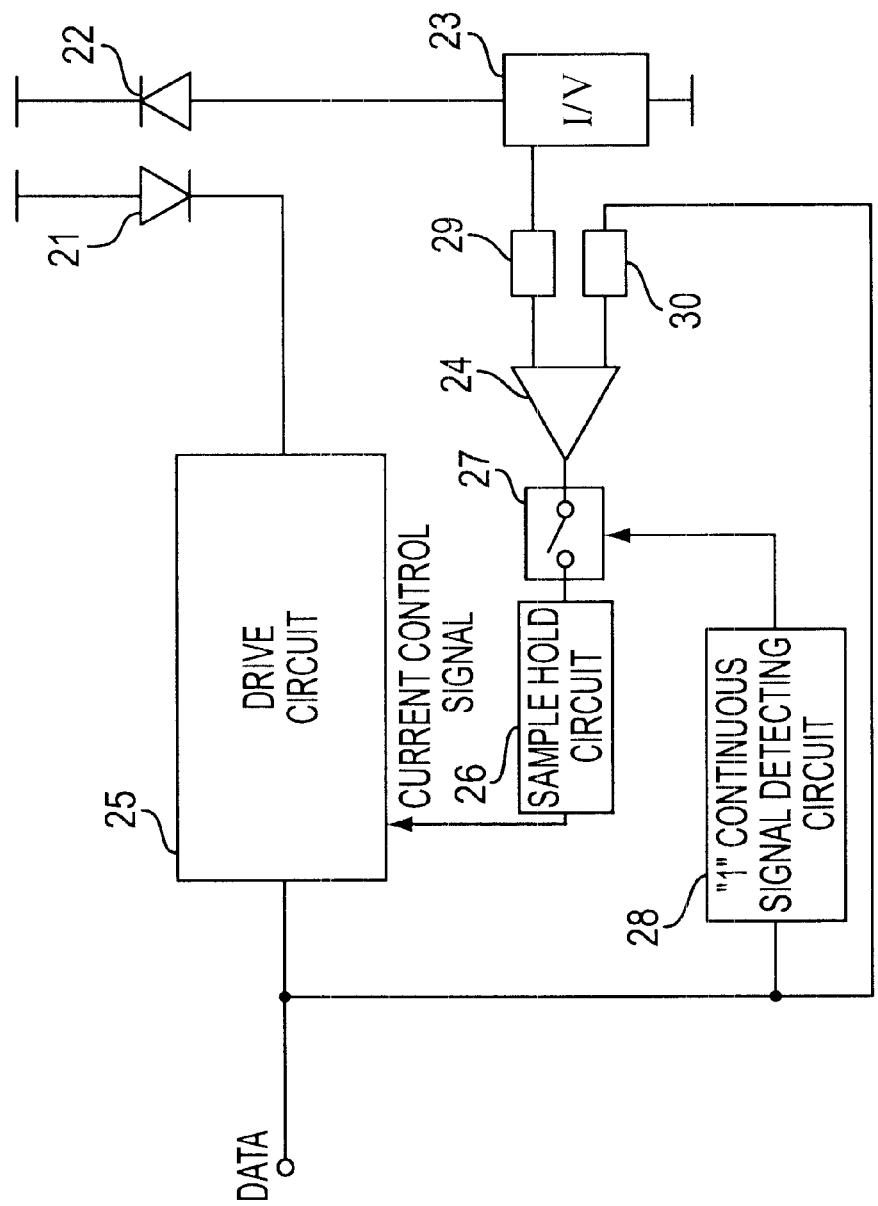
FIG. 6 is a block diagram of an optical transmitter in accordance with a third embodiment of the present invention.

FIG. 6 is a block diagram of an optical transmitter in accordance with a third embodiment of the present invention. The optical transmitter shown in FIG. 6 includes a light emitting element 21 such as a semiconductor laser, a light receiving element 22 such as a photodiode, a current-voltage converting circuit (I/V) 23, an APC amplifier 24, a drive circuit 25, a sample hold circuit 26, an analog switching circuit 27, a "1" continuous signal detecting circuit 28, and peak detecting circuits 29 and 30.

In accordance with the third embodiment of the invention, the peak detecting circuit 29 operates in the same manner as the peak detecting circuit 19 in the third embodiment shown in FIG. 4. The peak detection circuit 30 detects the peak values of the input data (DATA) and uses the detected value thereof as the reference value for the APC amplifier 24. By inputting the output signal of the current-voltage converting circuit 23 and the reference value to the APC amplifier 24 via the respective peak detecting circuits 29 and 30, the error portion of the peak detecting circuit 29 can be offset, and the optical output of the light emitting element 21 can be monitored with better accuracy.

Figure 7:
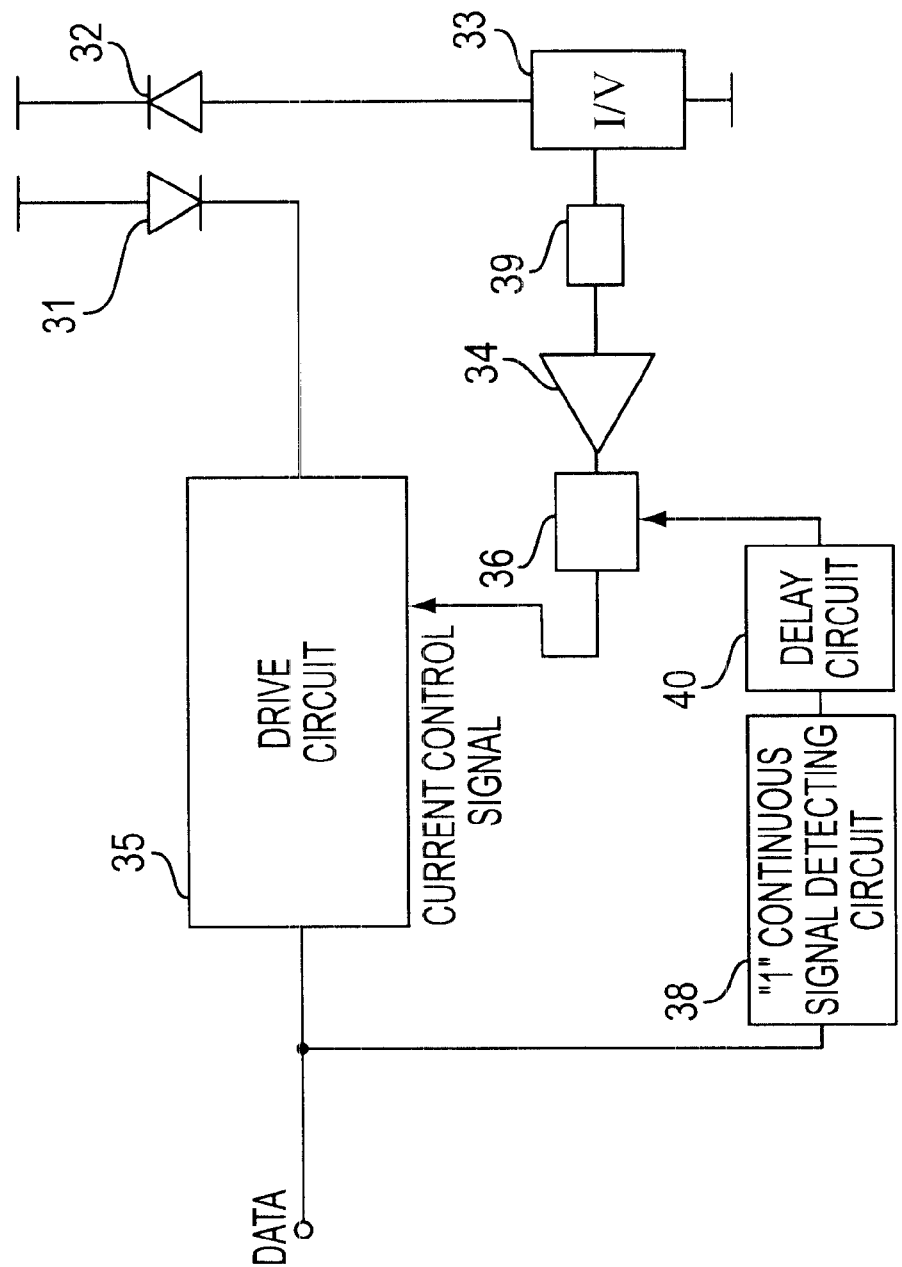
FIG. 7 is a block diagram of an optical transmitter in accordance with a fourth embodiment of the present invention.

FIG. 7 is a block diagram of an optical transmitter in accordance with a fourth embodiment of the present invention. The optical transmitter in accordance with the fourth embodiment of the invention includes a light emitting element 31 such as a semiconductor laser, a light receiving element 32 such as a photodiode, a current-voltage converting circuit (I/V) 33, an APC amplifier 34, a drive circuit 35, a sample hold circuit 36 which includes an analog switch circuit, a "1" continuous signal detecting circuit 38, a peak detecting circuit 39, and a delay circuit 40.

Figure 8:
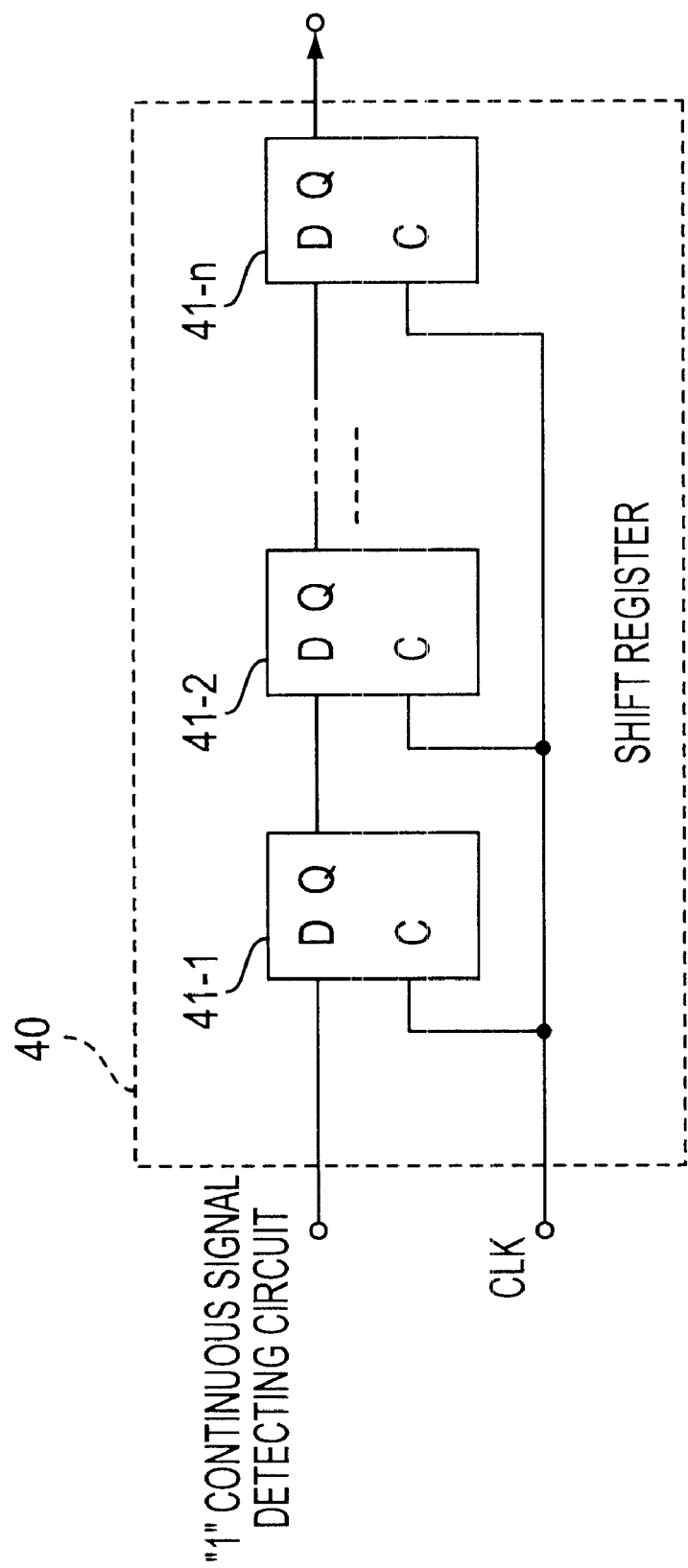
FIG. 8 is a diagram of a delay circuit in accordance with embodiments of the present invention.

The fourth embodiment of the present invention is similar to the third embodiment of the invention shown in FIG. 4 and further includes the delay circuit 40 between the "1" continuous signal detecting circuit 38 and the analog switch circuit 36. The delay circuit 40 is also applicable to the embodiments of the invention shown in FIG. 1 and FIG. 6. The delay circuit 40 may, for example, be a delay circuit as shown in FIG. 8. However, various other types of delay circuits may be used.

As shown in FIG. 8, the delay circuit 40 is preferably a shift register including a plurality of flip-flops 41-1 through 41-n which are vertically connected, with a clock signal CLK input to the respective clock terminals C of each flip-flop 41-1 through 41-n, and a detection signal from the "1" continuous signal detecting circuit 38 input to the data terminal D of the initial flip-flop 41-1. The delay time of the shift register delay circuit 40 can be selected in accordance with the speed of the clock signal CLK and the number of connections of the flip-flops 41-1 through 41-n.

As shown in FIG. 7, the output signal of the current-voltage converting circuit 33 is input to the peak detecting circuit 39 and its peak value is detected. However, as shown in FIG. 5C, there is a deviation in the time until the set value indicated by the broken line is reached, and there is also deviation in the timing at which two (2) continuous "1" bits are detected in the case of the embodiment shown in FIG. 2.

Therefore, the "1" continuous detection signal is delayed by the delay circuit 40 until the output signal of the current-voltage converting circuit 33 corresponding to the optical output by the light emitting element 31 is obtained. When the output signal of the peak detecting circuit 39 has been stabilized, the output signal of the APC amplifier 34 is held in the sample hold circuit 36 and is used as a current control signal that is input to the drive circuit 35. The operation of the other elements shown in FIG. 7 is similar to the operation of like elements in the embodiments described above, and an explanation of these like elements will not be repeated here.

Figure 9:
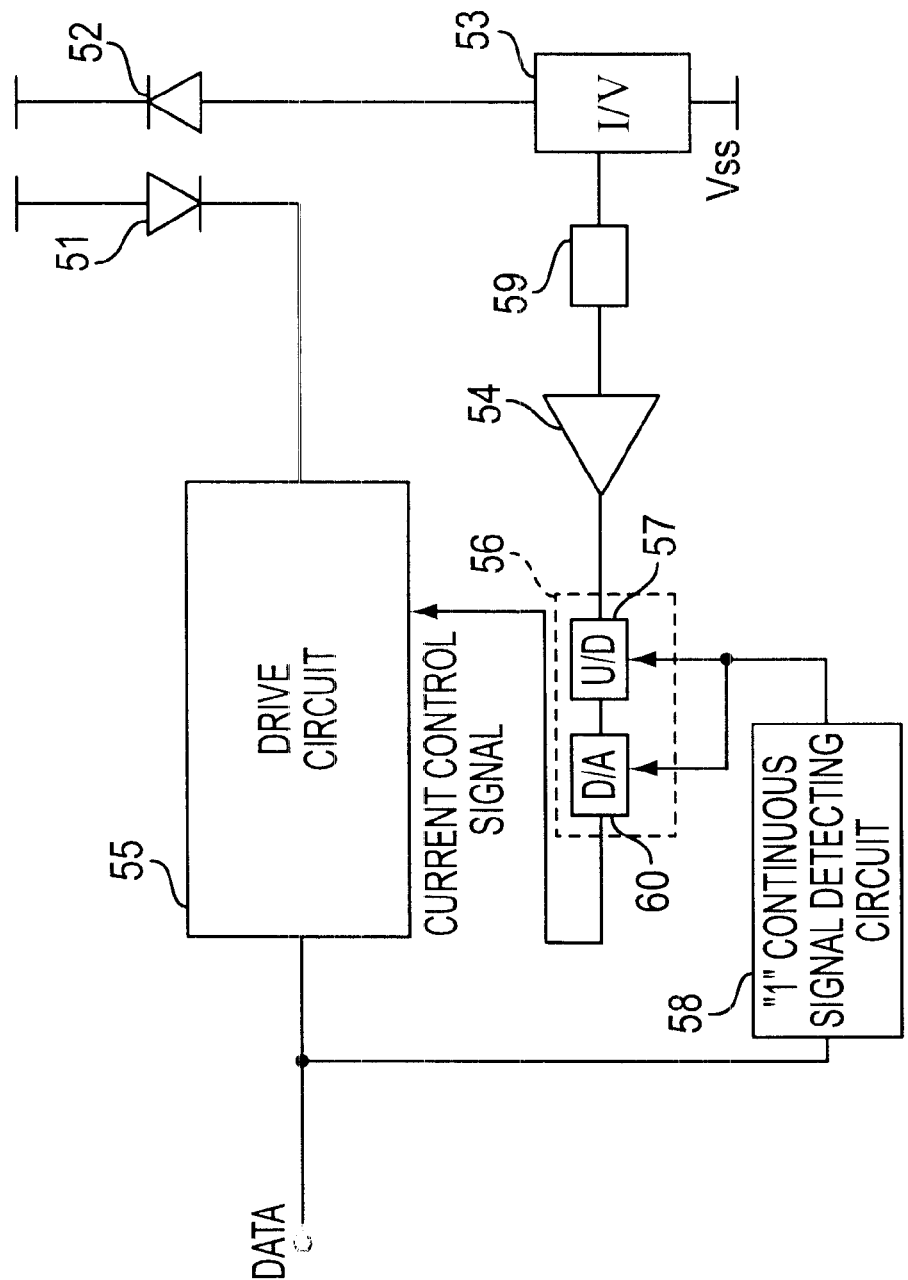
FIG. 9 is a block diagram of an optical transmitter in accordance with a fifth embodiment of the present invention.

FIG. 9 is a block diagram of an optical transmitter in accordance with a fifth embodiment of the present invention. As shown in FIG. 9, the optical transmitter includes a light emitting element 51 such as a semiconductor laser, a light receiving element 52 such as a photodiode, a current-voltage converting circuit (I/V) 53, an APC amplifier 54, a drive circuit 55, a digital hold circuit 56, an up/down counter (U/D) 57, a "1" continuous signal detecting circuit 58, a peak detecting circuit 59, and a digital-to-analog (D/A) converter 60.

In accordance with the fifth embodiment of the present invention, the digital hold circuit 56, which corresponds to the sample hold circuit in the above-described embodiments, comprises the up/down counter 57 and the D/A converter 58. As shown in FIG. 9, the detection signal from the "1" continuous signal detecting circuit 58 is used as an enable signal of the up/down counter 57. An up-count or a down-count is performed in correspondence to the output signal of the APC amplifier 54 when, for example, two (2) continuous "1" bits are detected in the input data (DATA).

For example, when the output signal of the peak detecting circuit 59 is higher than the reference value during detection of two (2) continuous "1" bits, the output signal of the APC amplifier 54 causes the up/down counter 57 to count down, while the up/down counter 57 counts up in accordance with the output signal of the APC amplifier 54 when the output signal of the peak detecting circuit 59 is lower than the reference value. In other words, the up/down counter 57 counts down when the optical output of the light emitting element 51 exceeds a set value, and counts up when the optical output of the light emitting element 51 is lower than the set value.

Accordingly, since the current control signal that is obtained by converting the count content of the up/down counter 56 into an analog signal by the D/A converter 60 is added to the gate of the transistor Q7 of the drive circuit 5 shown in FIG. 2, the optical output of the light emitting element 51 can be controlled to be a set value.

Figure 10:
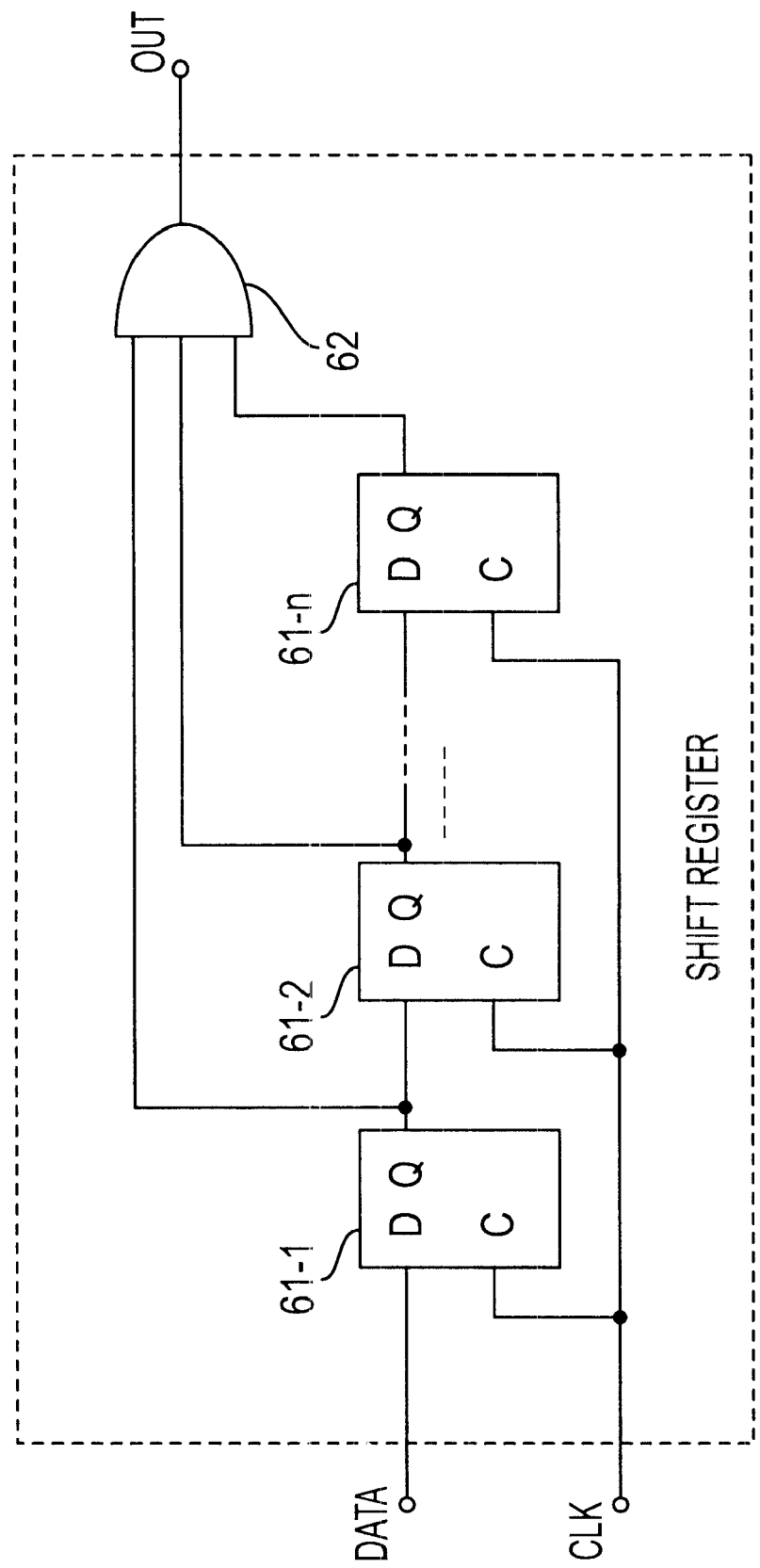
FIG. 10 is a diagram of a "1" continuous signal detecting circuit in accordance with embodiments of the present invention.

FIG. 10 is a diagram explaining the "1" continuous signal detecting circuit in accordance with embodiments of the present invention. As shown in FIG. 10, the "1" continuous signal detecting circuit is a shift register is comprising of a plurality of vertically connected flip-flops 61-1 through 61-n. A clock signal CLK is input to respective clock terminals C of the flip-flops 61-1 through 61-n, input data (DATA) is input into a data terminal D of the initial flip-flop 61-1, and the output signal Q of each respective flip-flop 61-1 through 61-n is input into an AND circuit 62.

When, for example, the clock signal CLK is synchronized with the bit of the input data (DATA), and two (2) continuous "1" bits are detected, the two flip-flops 61-1 and 61-2 are used in the "1" continuous bit detecting circuit, since the output terminals Q of the flip-flops 61-1 and 61-2 are both "1" because of the two continuous "1" bits, the output of the AND circuit 62 becomes "1." In other words, in the case of two (2) or more continuous "1" bits, continuous "1" detection signals are obtained. When a "0" bit is input, the output signal of the AND circuit 62 becomes "0."

Counting up or counting down by the up/down counter 57 is performed using the detection signal of the "1" continuous bit detecting circuit as the enable signal of the up/down counter 57. Furthermore, when three (3) or more continuous "1" bits are detected, three or more vertically connected flip-flops can be used. Of course, the "1" continuous signal detecting circuit shown in FIG. 10 can also be used as the "1" continuous signal detecting circuits 8, 18, 28, and 38 in the embodiments described above.

Figure 11:
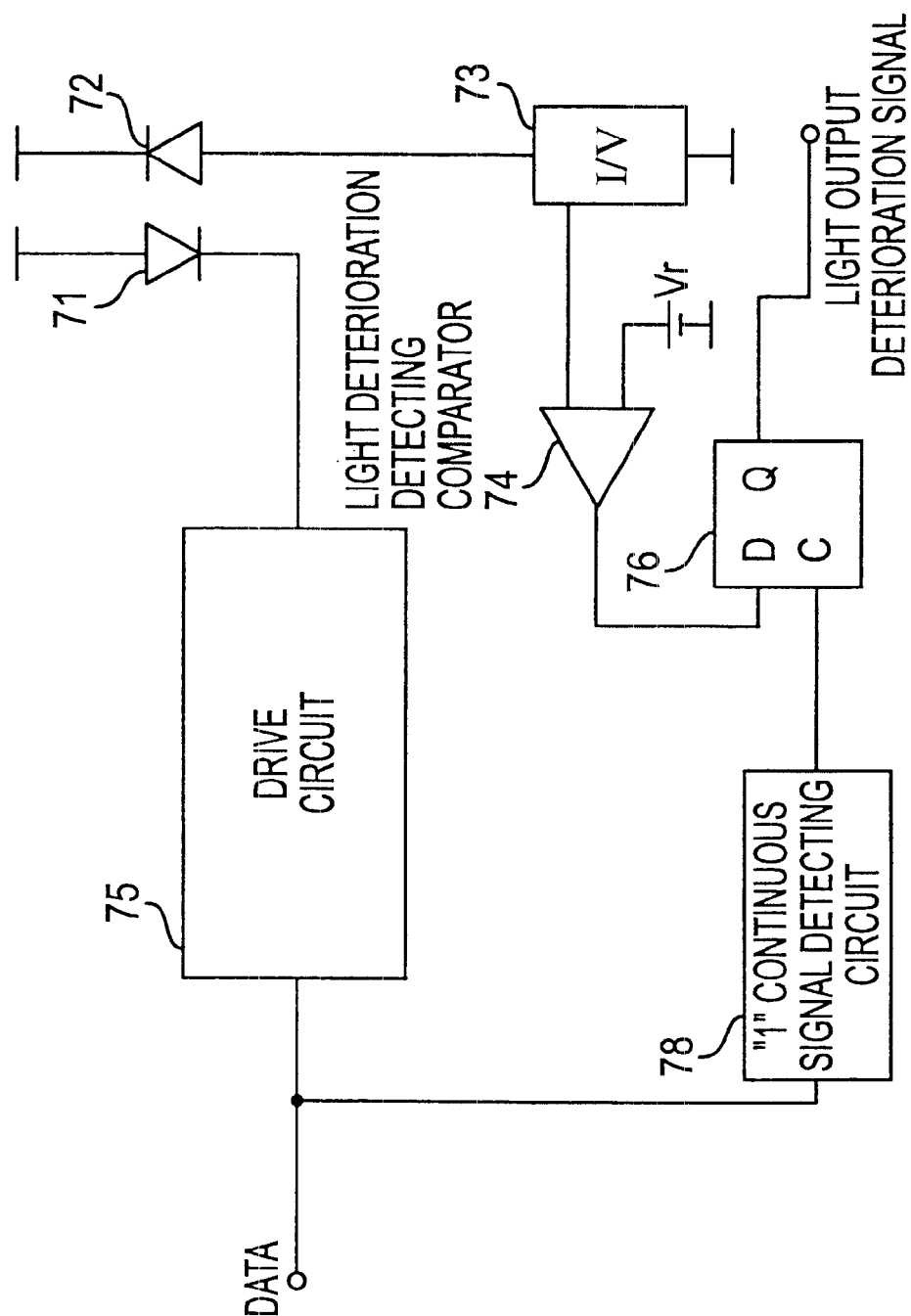
FIG. 11 is a block diagram of an optical transmitter in accordance with a sixth embodiment of the present invention.

FIG. 11 is a block diagram of an optical transmitter in accordance with a sixth embodiment of the present invention. As shown in FIG. 11, the optical transmitter includes a light emitting element 71 such as a semiconductor laser, a light receiving element 72 such as a photodiode, a current-voltage converting circuit (I/V) 73, a comparator 74 to detect light deterioration, a drive circuit 75, a flip-flop 76, and a "1" continuous signal detecting circuit 78.

The optical output of the light emitting element 71 is monitored by the light receiving element 72, and, when the optical output does not reach the desired optical output even when the drive current from the drive circuit 75 is controlled, it is judged that deterioration of the light emitting element 71 has occurred. In this case, when an inexpensive photodiode having response characteristics that are unable to follow the optical output of the light emitting element 71 is used as the light receiving element 72, even if the optical output corresponding to one isolated "1" bit in the input data (DATA) is monitored, the output signal of the current-voltage converting circuit 73 does not rise to the specified value, as described with reference to FIG. 3 and FIG. 5. Therefore, there is a possibility that the light emitting element 71 will be judged to have deteriorated.

However, in accordance with embodiments of the present invention, when a continuous "1" in the input data (DATA) is detected by the "1" continuous signal detecting circuit 78, it is determined whether or not the light emitting element 71 has deteriorated. More particularly, the output signal of the current-voltage converting circuit 73, which converts the output current of the light receiving element 72 to voltage, and the reference value Vr input to the light deterioration detecting comparator 74, are compared. A comparison output signal of "0" is input into the data terminal D of the flip-flop 76 when the output value of the current-voltage converting circuit 73 exceeds the reference value Vr, and a "1" is input to the data terminal D of the flip-flop 76 when the output value of the current-voltage converting circuit 73 is lower than the reference value Vr. The detection signal of the "1" continuous signal detecting circuit 78 is input to the clock terminal C of the flip-flop 76.

Thus, when the light emitting element 71 is in a normal status, the output signal of the current-voltage converting circuit 73 does not rise to the specified level in the case where the input data (DATA) is an independent "1" bit. Further, even if a "1" signal indicating deterioration is output from the light deterioration detecting comparator 74, because the flip-flop 76 is not set, an optical output deterioration signal is not produced. However, in the case of continuous "1" bits, that is, when the "1" continuous signal detecting circuit 78 detects two (2) continuous "1" bits in the input data (DATA), to judge that deterioration has occurred with two (2) continuous bits, if the output signal of the current-voltage converting circuit 73 does not reach the set value when there are two (2) continuous "1" bits are detected, the flip-flop 76 is set, an optical output deterioration signal is transmitted, and a deterioration alarm of the light emitting element 71 is activated.

In the embodiments described above, the drive circuit 75 may be any of various types of drive circuits. Further, when the response characteristics of the light receiving element 72 are relatively slow, the "1" continuous signal detecting circuit 78 can be designed to operate to determine whether or not there is deterioration of the light emitting element 71 when three continuous "1" bits are detected.

Figure 12:
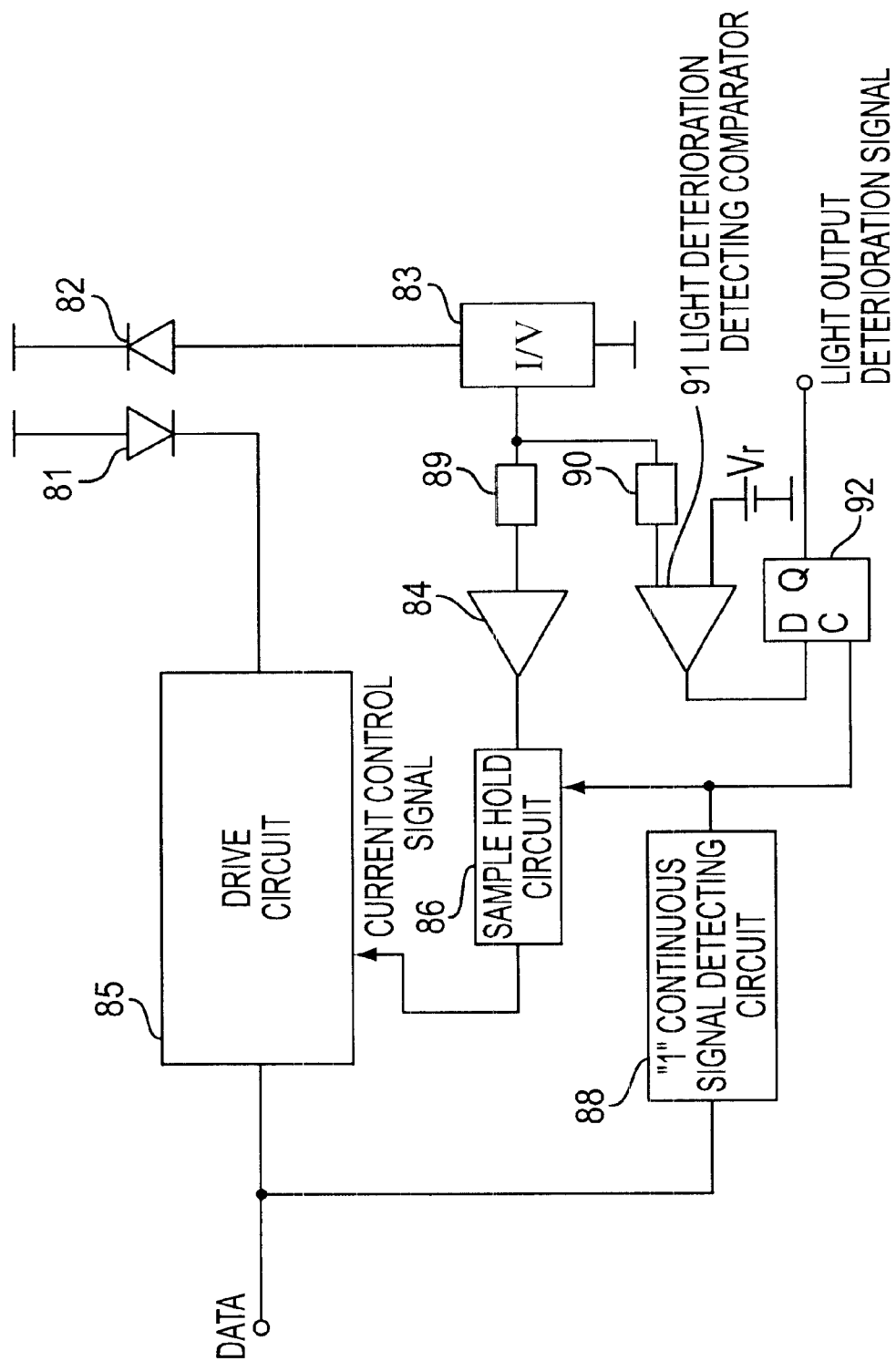
FIG. 12 is a block diagram of an optical transmitter in accordance with a seventh embodiment of the present invention.
Figure 13:
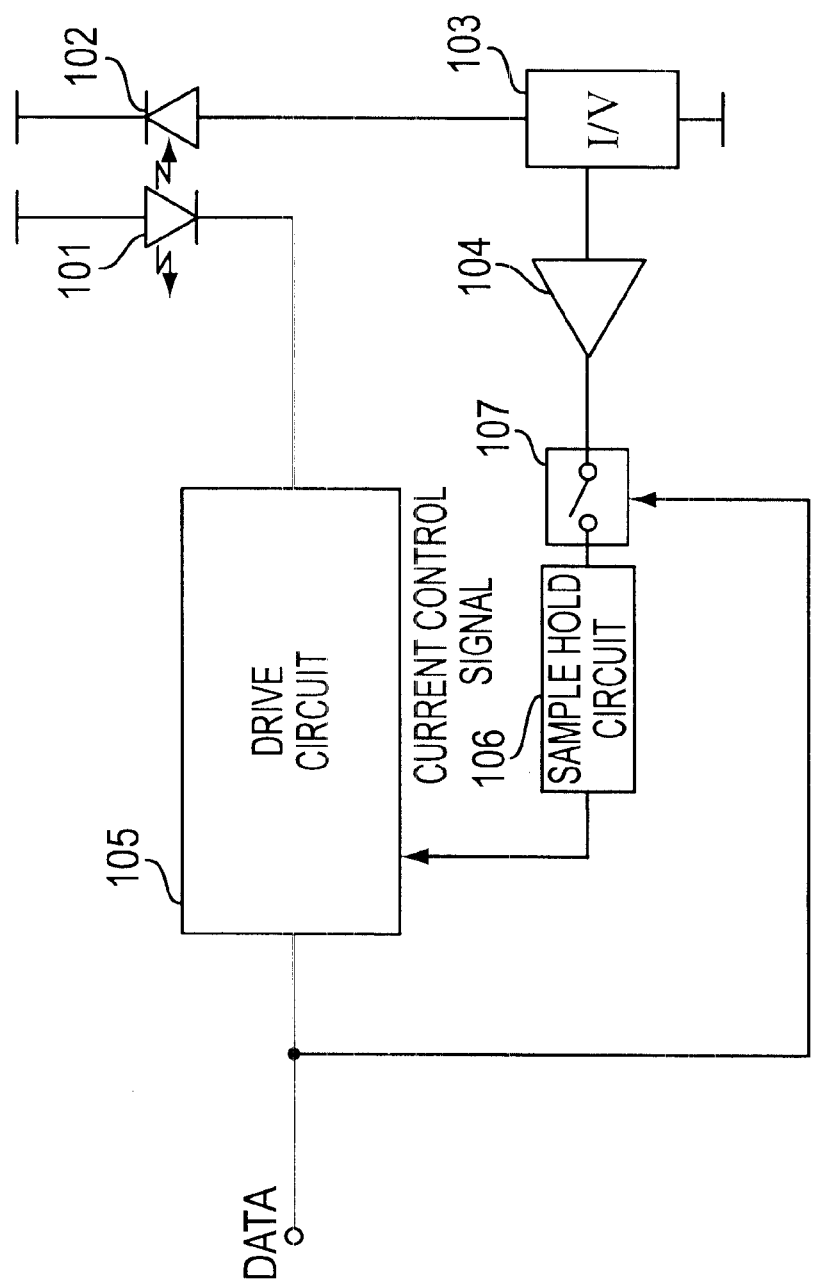
FIG. 13 is a block diagram of a conventional optical transmitter.
Figure 14A:
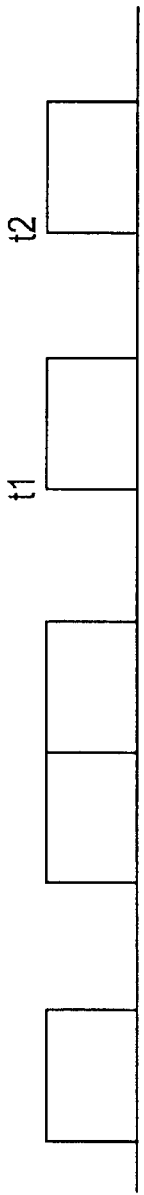
FIGS. 14A–14D are diagrams explaining operation of the conventional optical transmitter.
Figure 14B:
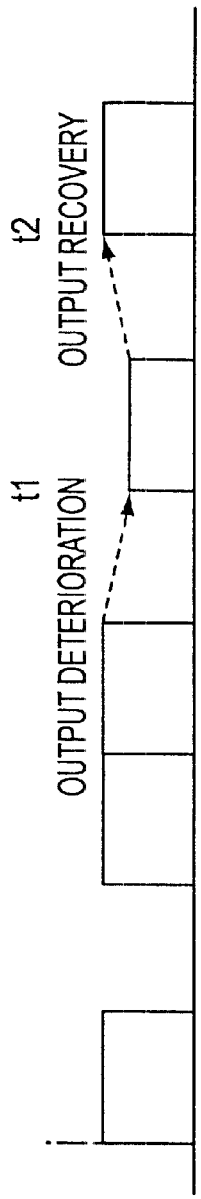
Figure 14C:
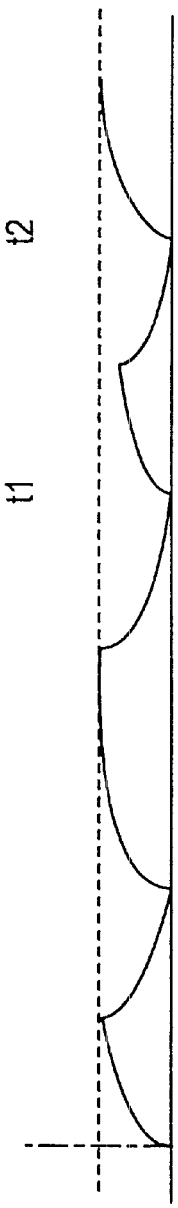
Figure 14D:
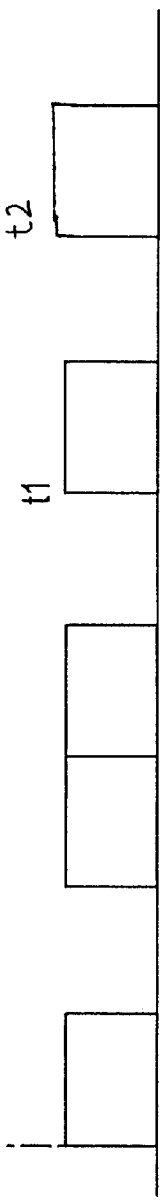
Figure 15A:
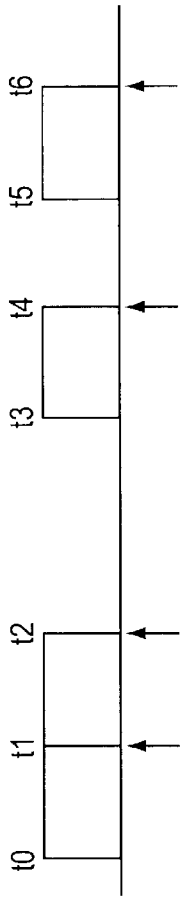
FIGS. 15A–15D are diagrams explaining the problems of APC operation in the conventional optical transmitter.
Figure 15B:
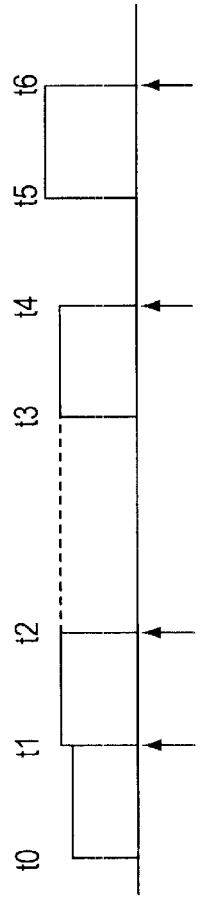
Figure 15C:
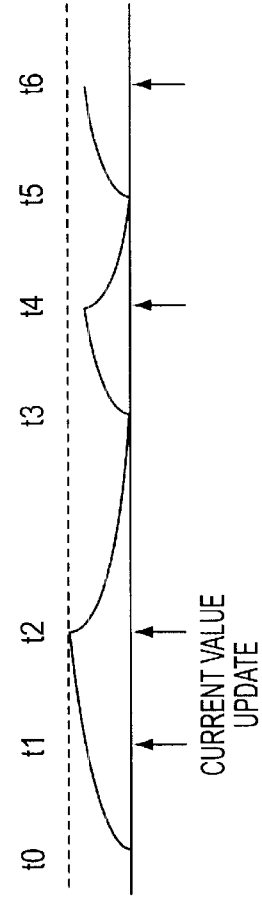
Figure 15D:
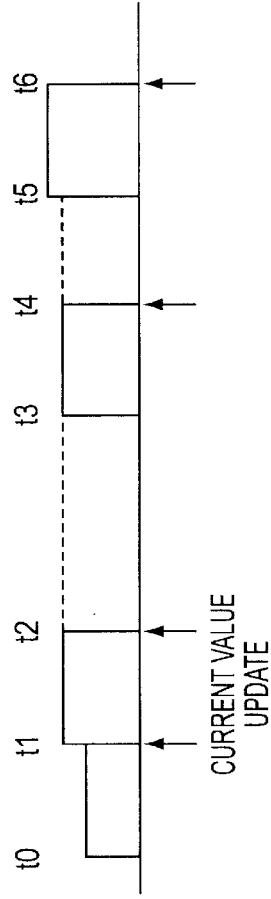

FIG. 12 is a block diagram of an optical transmitter in accordance with a seventh embodiment of the present invention. As shown in FIG. 12, the optical transmitter includes a light emitting element 81 such as a semiconductor laser, a light receiving element 82 such as a photodiode, a current-voltage converting circuit (I/V) 83, a comparator to detect optical deterioration 84, a drive circuit 85, a sample hold circuit 86, a "1" continuous signal detecting circuit 88, peak detecting circuits 89 and 90, a comparator 91 to detect optical deterioration, and a flip-flop 92.

In accordance with the seventh embodiment of the present invention, the peak detecting circuit 90, the comparator 91 to detect optical deterioration, and the flip-flop 92 are provided addition to the elements shown in the embodiment of FIG. 4, allowing the deterioration of the light emitting element 81 to be detected thereby. Furthermore, the monitoring of the optical output of the light emitting element 81 by the light receiving element 82, and the controlling of the drive circuit 85 in accordance with a current control signal so that the optical output remains constant, are performed in a manner similar to the embodiments shown in FIG. 1, FIG. 4, FIG. 6, and FIG. 7, and an explanation of these elements and their associated functions will not be repeated here.

In order to detect deterioration of the optical output generated by the light emitting element 81, the peak value of the output signal of the current-voltage converting circuit 83 is detected by the peak detecting circuit 90 and is compared with a reference value Vr by the optical deterioration detecting comparator 91 in a stabilized state. When the peak value is less than the reference value Vr, a "1" indicating deterioration of the light emitting element 81 is output, and otherwise a "0" is output. When a continuous "1" is not detected in the input data (DATA) by the "1" continuous signal detecting circuit 88, deterioration evaluation is not performed. However, when a continuous "1" is detected by the "1" continuous signal detecting circuit 88, the detected signal is input to the clock terminal C of the flip-flop 92. Accordingly, when the output signal of the for light deterioration detecting comparator 91 that is input into the data terminal D of the flip-flop 92 is "1" the flip-flop 92 is set, and the optical output deterioration signal of "1" is output from the output terminal Q.

The present invention is not limited to the embodiments described above, and various additions and alterations, as well as various combinations of the embodiments are possible. For example, embodiments of the present invention may operate such that the output signal of the current-voltage converting circuit is converted into a digital signal which undergoes digital processing.

As described above, in accordance with embodiments of the present invention, by providing a "1" continuous signal detecting circuit to detect continuous "1" bits in the input data (DATA), a conventional photodiode having a comparatively large capacity can be used as the light receiving element to monitor the light emitting element, such as a semiconductor laser or light emitting diode. More specifically, by using the detection of continuous "1" bits from the "1" continuous signal detection circuit, an update timing of the current control signal or a deterioration evaluation timing of the light emitting element can be performed. Accordingly, the advantage of cost reduction in the light transferring circuit can be achieved.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical transmitter circuit, comprising:
    a light emitting element to convert input data into an optical output;
    a light receiving element to receive the optical output of the light emitting element and to output a current corresponding to the optical output;
    a current-voltage converting circuit to convert the output current of the light receiving element into a voltage and to output a voltage signal;
    an amplifier to compare the output voltage signal of the current-voltage converting circuit and a reference signal and to output a differential output signal;
    a hold circuit to hold the output signal of the amplifier and to form a current control signal;
    a drive circuit to receive the current control signal from the hold circuit and to supply drive current to the light emitting element in accordance with the current control signal; and
    a "1" continuous signal detecting circuit to detect a specified number of continuous "1" bits in the input data and to perform an updating operation on the output signal of the amplifier held in the hold circuit.

2. An optical transmitter circuit as recited in claim 1, wherein the hold circuit comprises:
    an analog switching circuit to receive the output signal of the amplifier and a detection signal of the "1" continuous signal detecting circuit, and to switch on in response to the "1" continuous signal detecting circuit detecting the specified number of continuous "1" bits; and
    a peak detecting circuit to detect and hold a peak value of the output signal of the amplifier that is input via the analog switching circuit.

3. An optical transmitter circuit as recited in claim 1, further comprising a peak detecting circuit to detect a peak value of the output signal of the current-voltage converting circuit and to input the peak value to the amplifier.

4. An optical transmitter circuit as recited in claim 1, further comprising:
    a first peak detecting circuit to detect a peak value of the output signal of the current-voltage converting circuit and to output the peak value to the amplifier; and
    a second peak detecting circuit to detect a peak value of the input data and to output the peak value of the input data to the amplifier as a reference value.

5. An optical transmitter circuit as recited in claim 1, wherein the hold circuit comprises:
    an up/down counter to count up or down corresponding to an output signal of the amplifier, in response to the "1" continuous signal detecting circuit detecting the specified number of continuous "1" bits; and
    a D/A converter to convert the contents of the count of the up/down counter to an analog signal and to input the contents of the count of the up/down counter to the drive circuit as an analog current control signal.

6. An optical transmitter circuit as recited in claim 5, wherein the up/down counter counts down in response to the output of the light emitting element exceeding a set value and counts up in response to the output of the light emitting element being lower than the set value.

7. An optical transmitter circuit, comprising:
    a light emitting element to convert input data into an optical output;
    a light receiving element to receive the optical output of the light emitting element and to output a current corresponding to the optical output;
    a current-voltage converting circuit to convert the output current of the light receiving element into a voltage;
    a light deterioration detecting comparator to detect deterioration in the light receiving element by comparing the output signal of the current-voltage converting circuit with a reference value and to output a deterioration detection signal;
    a "1" continuous signal detecting circuit to detect a specified number of continuous "1" bits in the input data and to output a detection signal; and
    a flip-flop to hold the deterioration detection signal from the light deterioration detection comparator in accordance with the detection signal from the "1" continuous signal detecting circuit.

8. An optical transmitter circuit as recited in claim 7, further comprising:
    an amplifier to receive the output voltage of the current-voltage converting circuit;

a drive circuit to drive the light emitting element; and a hold circuit to hold the output signal of the amplifier in accordance with the detection signal from the "1" continuous signal detecting circuit and to input a current control signal to the drive circuit of the light emitting element.

9. An optical transmitter circuit as recited in claim 8, further comprising a delay circuit to delay the detection signal from the "1" continuous signal detecting circuit and to input the delayed detection signal to the hold circuit and flip-flop.

10. An optical transmitter including a light emitting element to convert input data to an optical output, comprising:

a current generator to generate a drive current to drive the light emitting element;

a continuous signal detecting circuit to detect a predetermined number of continuous "1" bits in the input data and to output a control signal to the current generator to control the drive current in response to detecting the predetermined number of "1" bits, wherein the current generator comprises:

a light receiving element to receive the optical output of the light emitting element and to output a current corresponding to the optical output;

a current-voltage converting circuit to convert the output current of the light receiving element into a voltage and to output a voltage signal;

a drive circuit to supply drive current to the light emitting element; and a current control signal generator to receive the voltage signal output by the current-voltage converting circuit and the control signal output by the continuous signal detecting circuit and to generate a current control signal to control the drive current supplied to the light emitting element by the drive circuit.

11. An optical transmitter as recited in claim 10, wherein the current control signal generator includes a switching circuit, and the control signal output by the continuous signal detecting circuit controls switching of the switching circuit to update the current control signal.

12. An optical transmitter as recited in claim 10, wherein the current control signal generator includes an up/down counter to count up or down in response to the control signal generated by the continuous signal detecting circuit, wherein a count of the up/down counter controls the drive current.

13. An optical transmitter as recited in claim 11, wherein the current control signal generator further comprises a delay circuit between the continuous signal detecting circuit and the switching circuit to delay the control signal from the continuous signal detecting circuit.

14. An optical transmitter as recited in claim 11, wherein the current control signal generator comprises:

a comparator to compare the output voltage signal of the current-voltage converting circuit and a reference signal and to output a difference signal; and a sample and hold circuit to receive the difference signal output by the comparator in response to the switching circuit being switched on, to hold the difference signal output by the comparator, and to input the held difference signal to the drive circuit as the current control signal.

15. An optical transmitter circuit, comprising:

a light emitting element to convert input data into an optical output;

a light receiving element to receive the optical output of the light emitting element and to output a current corresponding to the optical output;

a current-voltage converting circuit to convert the output current of the light receiving element into a voltage and to output a voltage signal;

an amplifier to compare the output voltage signal of the current-voltage converting circuit and a reference signal and to output a differential output signal;

a hold circuit to hold the output signal of the amplifier and to form a current control signal;

a drive circuit to receive the current control signal from the hold circuit and to supply drive current to the light emitting element in accordance with the current control signal; and means for detecting a specified number of continuous "1" bits in the input data and for performing an updating operation on the output signal of the amplifier held in the hold circuit.

16. An optical transmitter circuit, comprising:

a light emitting element to convert input data into an optical output;

a light receiving element to receive the optical output of the light emitting element and to output a current corresponding to the optical output;

a current-voltage converting circuit to convert the output current of the light receiving element into a voltage;

means for detecting deterioration in the light receiving element by comparing the output signal of the current-voltage converting circuit with a reference value and for outputting a deterioration signal;

means for detecting a specified number of continuous "1" bits in the input data and for outputting a detection signal; and means for holding the deterioration signal in accordance with the detection signal.

17. An optical transmitter including a light emitting element to convert input data to an optical output, comprising:

a current generator to generate a drive current to drive the light emitting element; and a continuous signal detecting circuit to detect a predetermined number of continuous "1" bits in the input data and to output a control signal to the current generator to control the drive current in response to detecting the predetermined number of "1" bits, wherein the current generator comprises:

a light receiving element to receive the optical output of the light emitting element and to output a current corresponding to the optical output;

a current-voltage converting circuit to convert the output current of the light receiving element into a voltage and to output a voltage signal;

a drive circuit to supply drive current to the light emitting element; and means for generating a current control signal to control the drive current supplied to the light emitting element by the drive circuit, in accordance with the voltage signal output by the current-voltage converting circuit and the control signal output by the continuous signal detecting circuit.

* * * * *